(12) United States Patent
Graham et al.

(10) Patent No.: US 6,481,188 B1
(45) Date of Patent: Nov. 19, 2002

(54) APPARATUS AND METHOD FOR SEALING AN ARTICLE

(75) Inventors: William David Graham, Granville, OH (US); David P. Aschenbeck, Newark, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 210 days.

(21) Appl. No.: 09/608,058

(22) Filed: Jun. 30, 2000

(51) Int. Cl.[7] ............................................... B65B 51/10
(52) U.S. Cl. ........................ 53/479; 53/480; 53/373.5; 53/374.5
(58) Field of Search ............... 53/479, 480, 373.5, 53/389.5, 416, 477, 374.5

(56) References Cited

U.S. PATENT DOCUMENTS

| | | |
|---|---|---|
| 3,551,261 A | 12/1970 | Histed |
| 3,621,637 A | 11/1971 | Sternau |
| 3,810,811 A | 5/1974 | Bosse |
| 3,914,917 A * | 10/1975 | Young |
| 4,517,790 A | 5/1985 | Kreager |
| 4,599,940 A | 7/1986 | Held |
| 4,670,279 A | 6/1987 | Lesch |
| 4,794,855 A | 1/1989 | Okajima et al. |
| 5,237,800 A | 8/1993 | Omori |
| 5,303,644 A | 4/1994 | Held |
| 5,337,542 A | 8/1994 | Omori |
| 5,357,731 A | 10/1994 | Conway et al. |
| 5,421,931 A | 6/1995 | Carmien |
| 5,548,946 A | 8/1996 | Holub |
| 5,603,801 A | 2/1997 | DeFriese et al. |
| 5,755,923 A | 5/1998 | Kleinhenz et al. |
| 5,968,306 A | 10/1999 | Kleinhenz et al. |
| 5,987,856 A * | 11/1999 | Lerner .......................... 53/479 |
| 6,161,366 A * | 12/2000 | Bausch et al. ................ 53/477 |

* cited by examiner

Primary Examiner—Eugene Kim
Assistant Examiner—Sameh Tawfik
(74) Attorney, Agent, or Firm—Inger H. Eckert; James J. Dottavio

(57) ABSTRACT

An apparatus and method is provided for sealing a package. The apparatus comprises a first rotating belt and a second rotating belt adjacent to the first rotating belt. The first and second rotating belt have a synchronized travel speed. The first rotating belt carries a sealing device for sealing a package, the package being located between said first and second belts.

32 Claims, 11 Drawing Sheets

APPARATUS AND METHOD FOR SEALING AN ARTICLE

TECHNICAL FIELD

The present invention relates to an apparatus for creating a seal in packaging material.

BACKGROUND OF THE INVENTION

Apparatuses for creating seals in polymeric film are known in the art. In the past, these apparatuses have required products to undergo several mechanical steps for the product to ultimately become sealed in film. One past apparatus, U.S. Pat. No. 5,357,731, requires several sealing and cutting devices to seal a package. The package, as it moves along a conveyor, and is first sealed on the "front" end, sealed on the sides, then sealed on the "back" end by three separate sealing wheels. After sealing, the film on the package is cut by a fourth cutting wheel.

A second apparatus, described in U.S. Pat. No. 5,237,800, similarly contains several sealing units, through which an article must pass to be sealed. The film on the article is first sealed by a center sealing unit, then the ends of the film are sealed by an end sealing unit and finally a heating unit to shrink wrap the film on the article.

In a third apparatus, described in U.S. Pat. No. 5,548,946, a package is sealed on the sides by sealing rollers and then the ends are sealed by cross seal tools which are attached to a casing. Another apparatus, U.S. Pat. No. 4,517,790, involves packaging film formed in a tube where an individual product is dropped into the tube. After passing through the tube an ultrasonic welder seals the front end of the packaging film and then the back end.

Because these apparatuses require the package to undergo several steps to be sealed, only a few packages may be sealed at a time. This results in a slower line speed decreasing overall productivity, and the required apparatus is excessively large and complex.

Other apparatuses, including that of U.S. Pat. No. 3,551,261, use sealing bars which move by means of pivot arms. In these type devices, the contact time of the blade on the film is controlled by a timing mechanism. When sealing the film, the bar is in the "down" position and raised to the "up" position when sealing is complete. Only one product may be sealed at a time, and the up and down movement of the blade decreases the overall line speed of the products as they proceed through the sealing process.

Another apparatus, U.S. Pat. No. 5,603,801, uses a sealing blade controlled by a hydraulic air cylinder arm. The contact time of the blade with the film is controlled by a timing mechanism. As with the other apparatuses, this apparatus only permits one product to the sealed at a time, decreasing line speed of the products.

Other apparatuses use a servo-drive assembly for advancing a heat seal bar back and forth along a path to seal packages, for example, U.S. Pat. Nos. 5,755,923 and 5,968,306 which are incorporated herein by reference in their entirety.

The past apparatuses include complex, cumbersome structures involving various mechanisms to control the blade as it seals products. Accordingly, the complexity of these structures detract from the cost, reliability, and attainable line speed using these devices. It would be advantageous to develop an improved sealing apparatus that reliably seals packages at an increased line speed, and which would be relatively inexpensive to produce.

SUMMARY OF THE INVENTION

Accordingly, it is an object of the present invention to provide a sealing apparatus and method that enables products to be sealed at an increased line speed, allows for both ends of a package to be sealed in overlapping time periods by a retractable sealing device and is simple in design and inexpensive to produce.

It is an object of the present invention to provide a sealing apparatus that can seal packaging material at increased line speeds.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
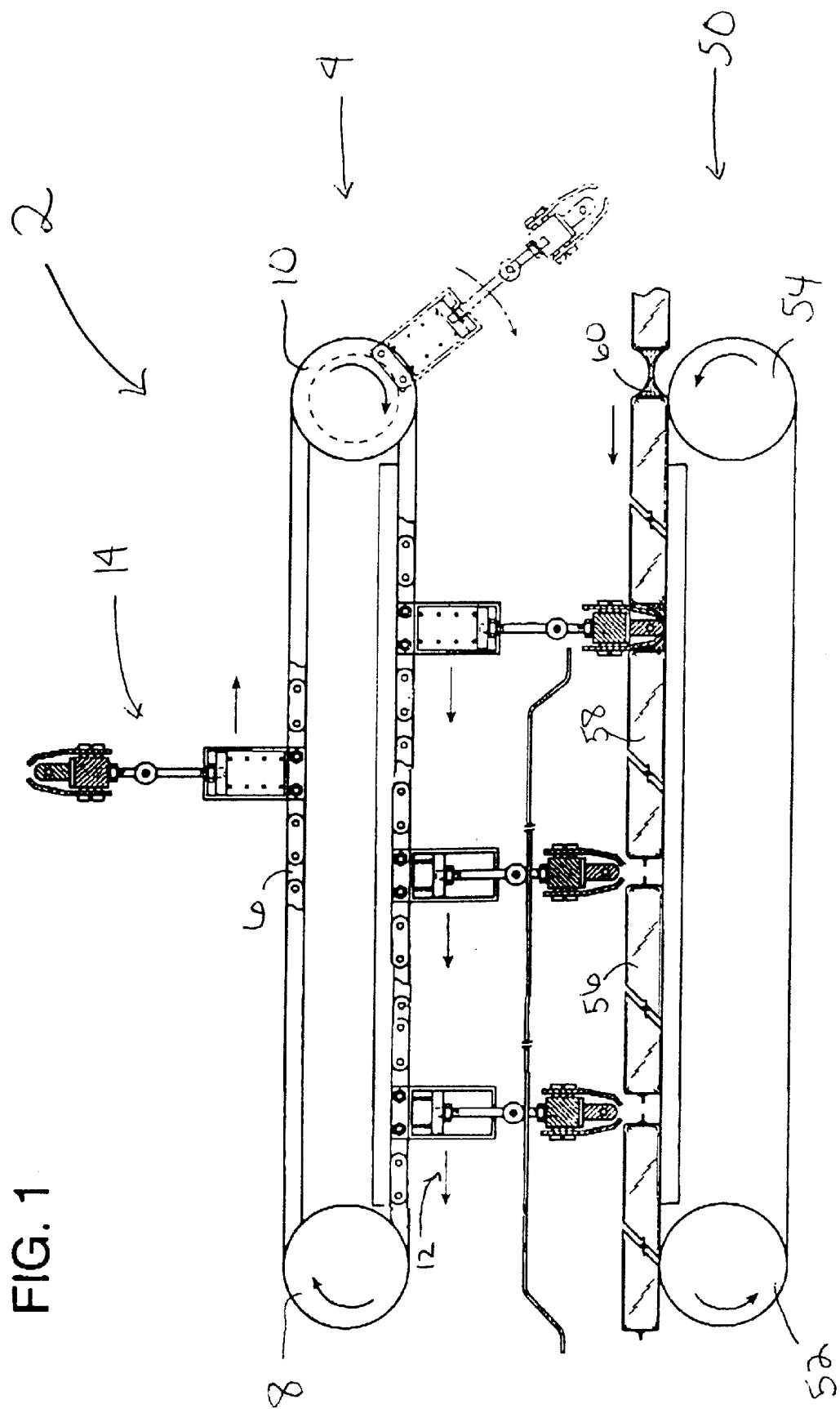
FIG. 1 is a side view of a sealing device according to the present invention.
Figure 2:
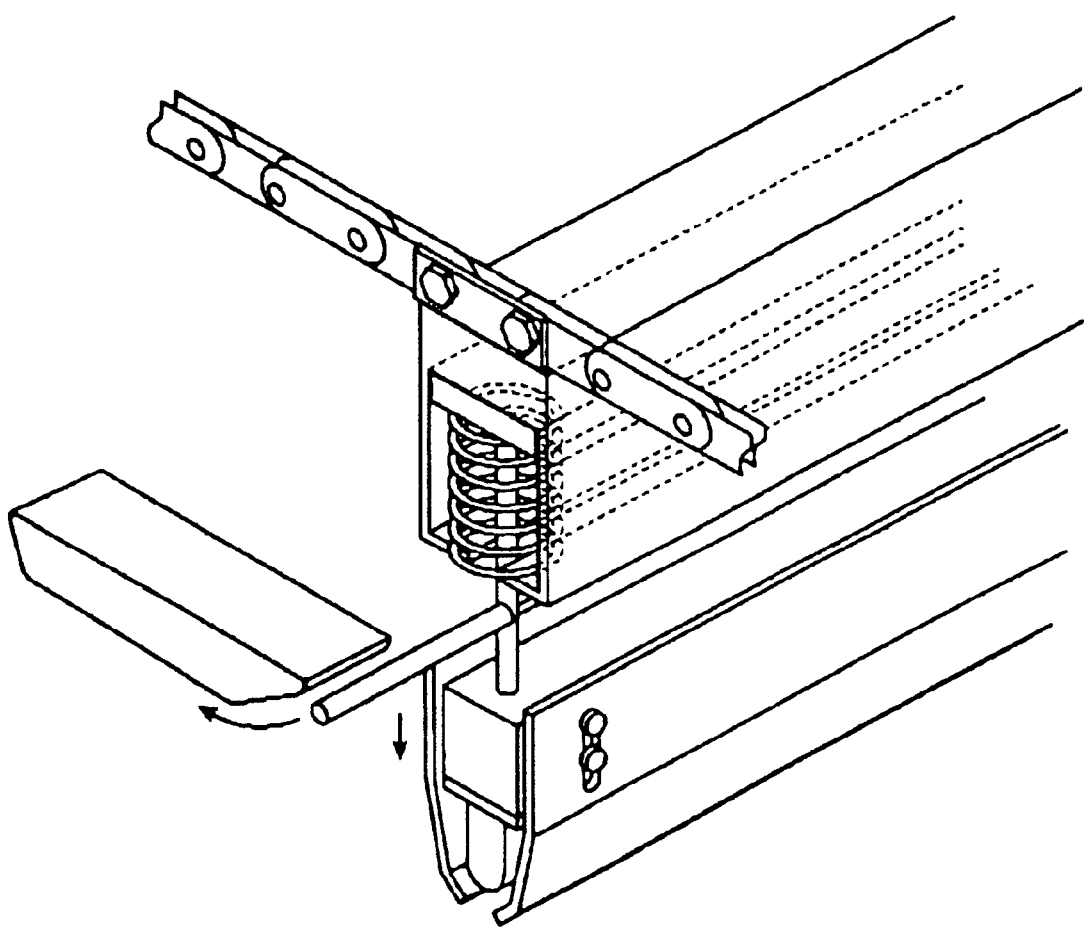
FIG. 2 is an isometric view of a portion of a sealing device according to the present invention.
Figure 3:
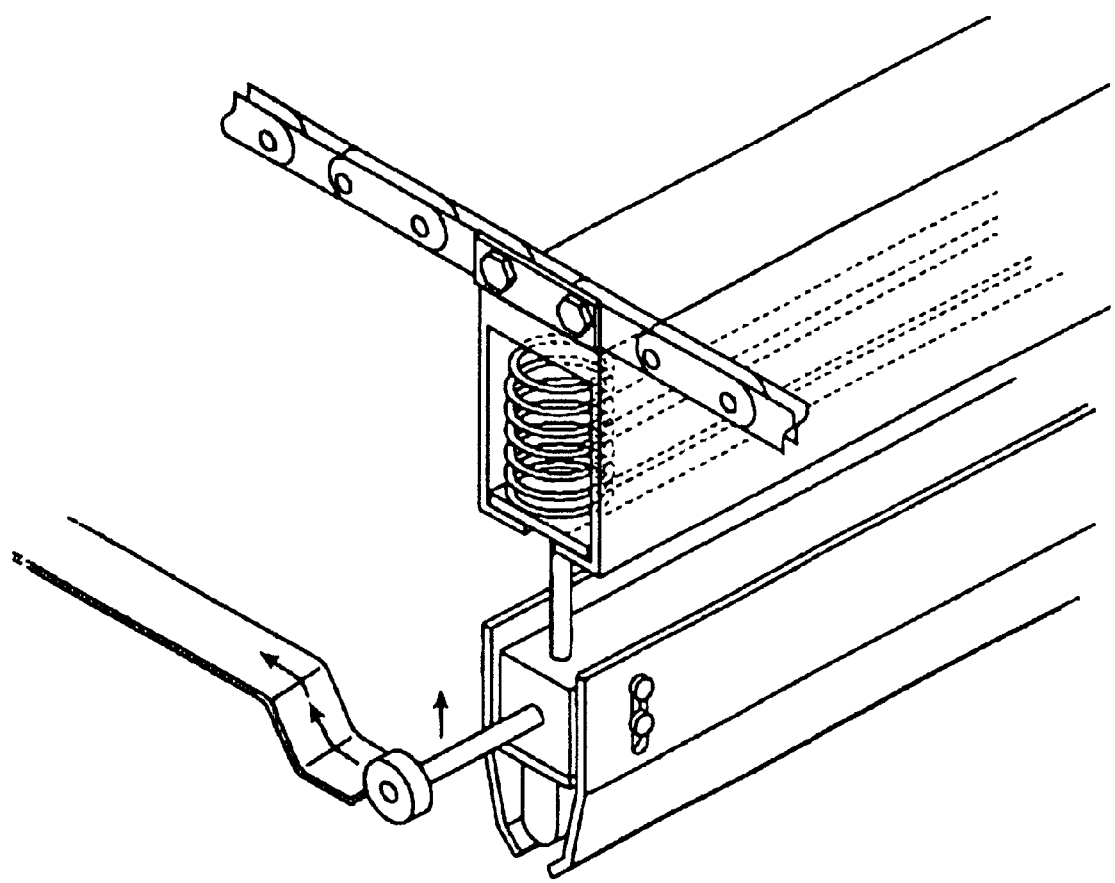
FIG. 3 is an isometric view of a portion of an alternative embodiment of a sealing device according to the present invention.
Figure 4:
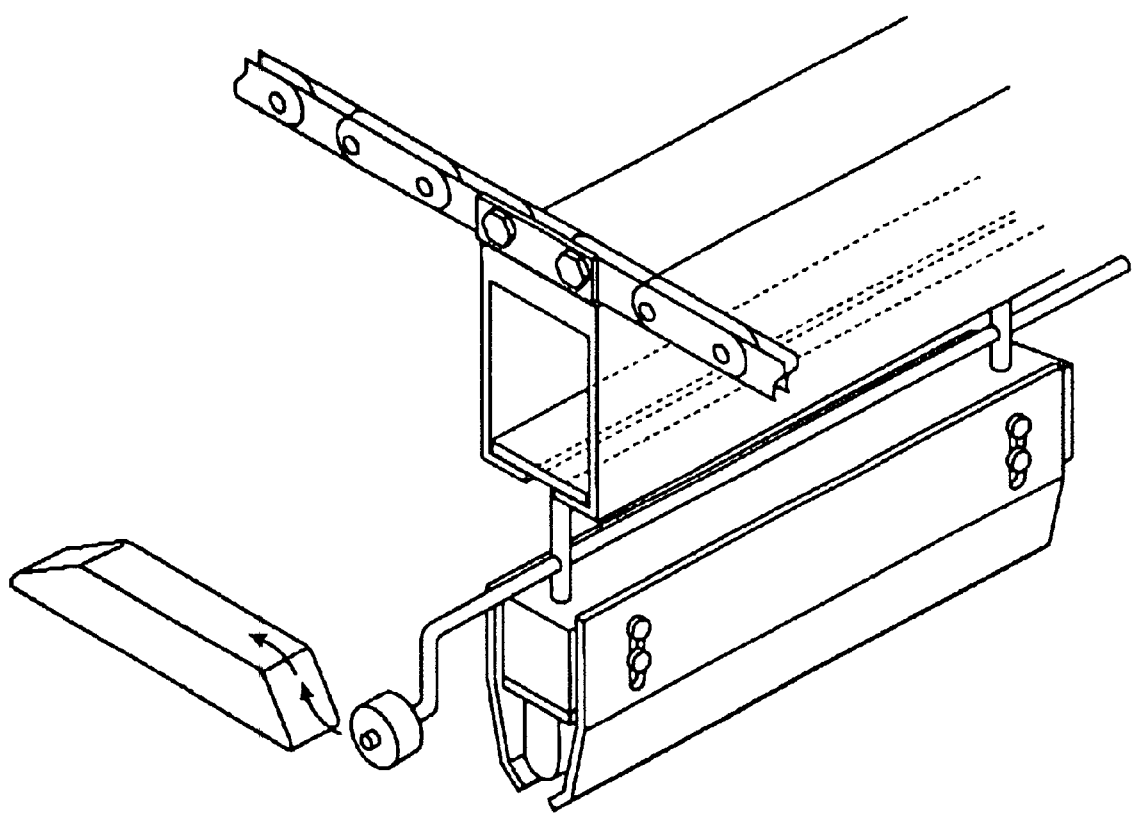
FIG. 4 is an isometric view of a portion of a further alternative embodiment of a sealing device according to the present invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although preferred embodiments of the invention are herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE DRAWINGS

Referring now to the drawings, the illustrated sealing apparatus 2 includes a top assembly 4 having a first rotating belt 6 which passes over sprockets 8 and 10 and moves in a first direction as shown by arrow 12. A sealing means 14 is attached to the rotating belt 6 as is further described below. The rotating belt 6 can be a chain, belt, or any other suitable material capable of supporting the sealing means 14. The sprockets 8 and 10 are connected to a frame (not shown) which provides support to the entire sealing apparatus, and the belt 6 is driven by a motor (not shown) in a known manner.

Figure 5:
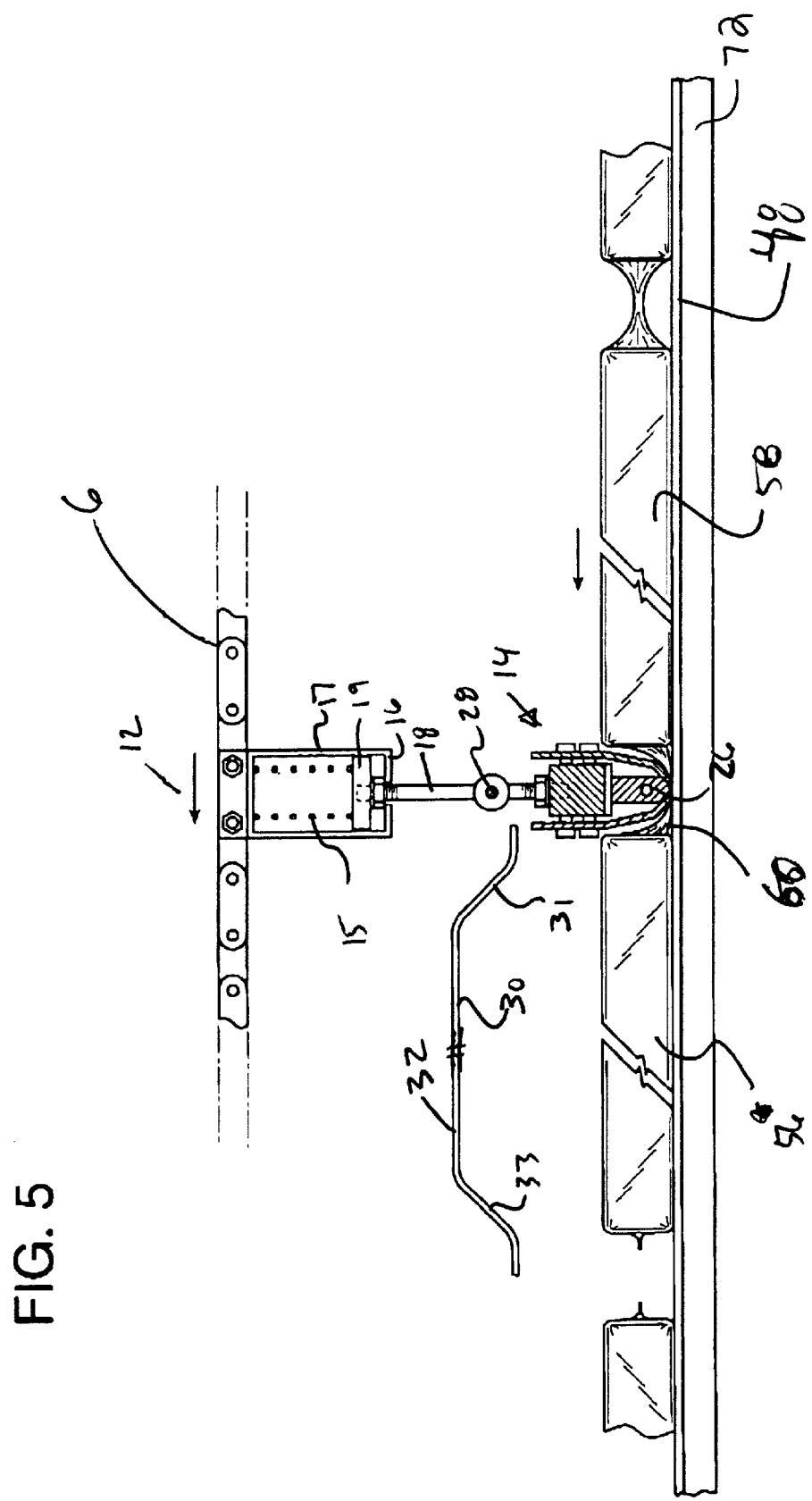
FIG. 5 is a side view of a portion of the sealing device shown in FIG. 3.
Figure 6:
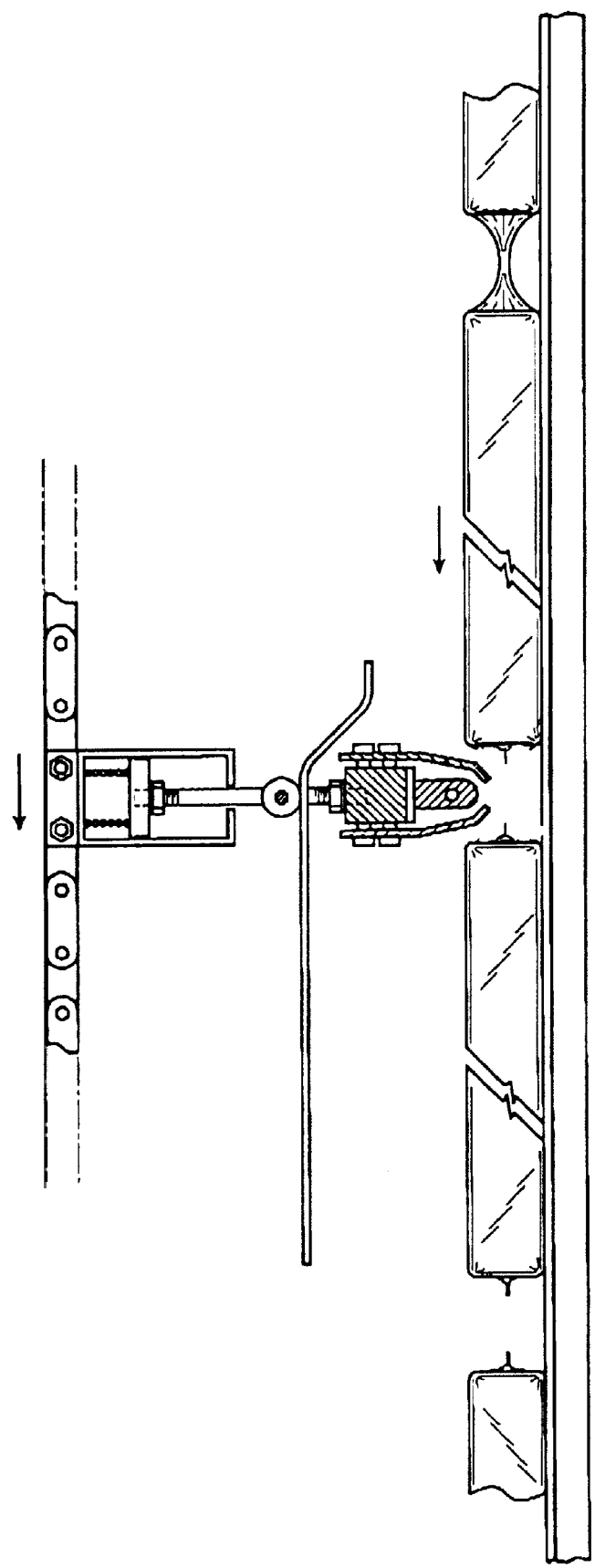
FIG. 6 is a side view of the portion of the sealing device shown in FIG. 5 with the blade held out of contact with the package.

As shown in FIG. 5, the sealing unit 14 is supported by a bracket 17 attached to the belt 6. In a preferred embodiment, as illustrated in the Figures, the bracket 17 supports a rod 18 in a spring-biased manner, and the rod 18 supports the sealing bar 26. As illustrated in the figures, the bracket 17 includes a bottom 16 through which the rod 18 projects. A spring 15 urges the sealing means bar 26 downwardly away from the belt 6 and into contact with the wrapper 60. Preferably, the sealing bar 26' includes most of the features of the sealing bar described in U.S. Pat. No. 5,755,923, including the shielding and spring biasing, and is therefore this description is not described or illustrated herein in great detail.

As shown in FIG. 5, the sealing bar 26 engages the wrapper material 60 between adjacent packages 56, 58 carried by a lower conveyor 48 in a known manner, and as is further described below, and seals the package 56 in a manner as described in the '923 patent.

Preferably, the sealing apparatus 14 is retractable. This is accomplished as shown in FIG. 5, using a rod 18 preferably including a lever 28. As the belt 6 carries the sealing apparatus 14 leftwardly as viewed in FIG. 5, the lever 28 contacts a cam plate 32 after the packages are sealed. The cam plate is preferably supported by the frame 5, and includes a ramped portion 31 and an upper portion 30. As the lever 28 first engages the cam plate ramp 31, it imparts an upward force upon the rod 18, urging the sealing bar 26 upwardly against the reactive force caused but the compression of the spring 15. The seal bar 26 is then retracted from contact with the wrapper material 60 while the lever 28 rides on the upper portion 30. At the end of the cam plate 32, a down ramp 33 may be provided, or alternatively, the conveyor 6 may lift the lever 28 from contact with the cam plate 32. Preferably, lever 28 includes a wheel or roller bearing for contact with the cam plate 32. One skilled in the art appreciates the length of the cam plate 32 depends on various factors, including the line speed, the temperature, the material being sealed, and such.

Figure 9:
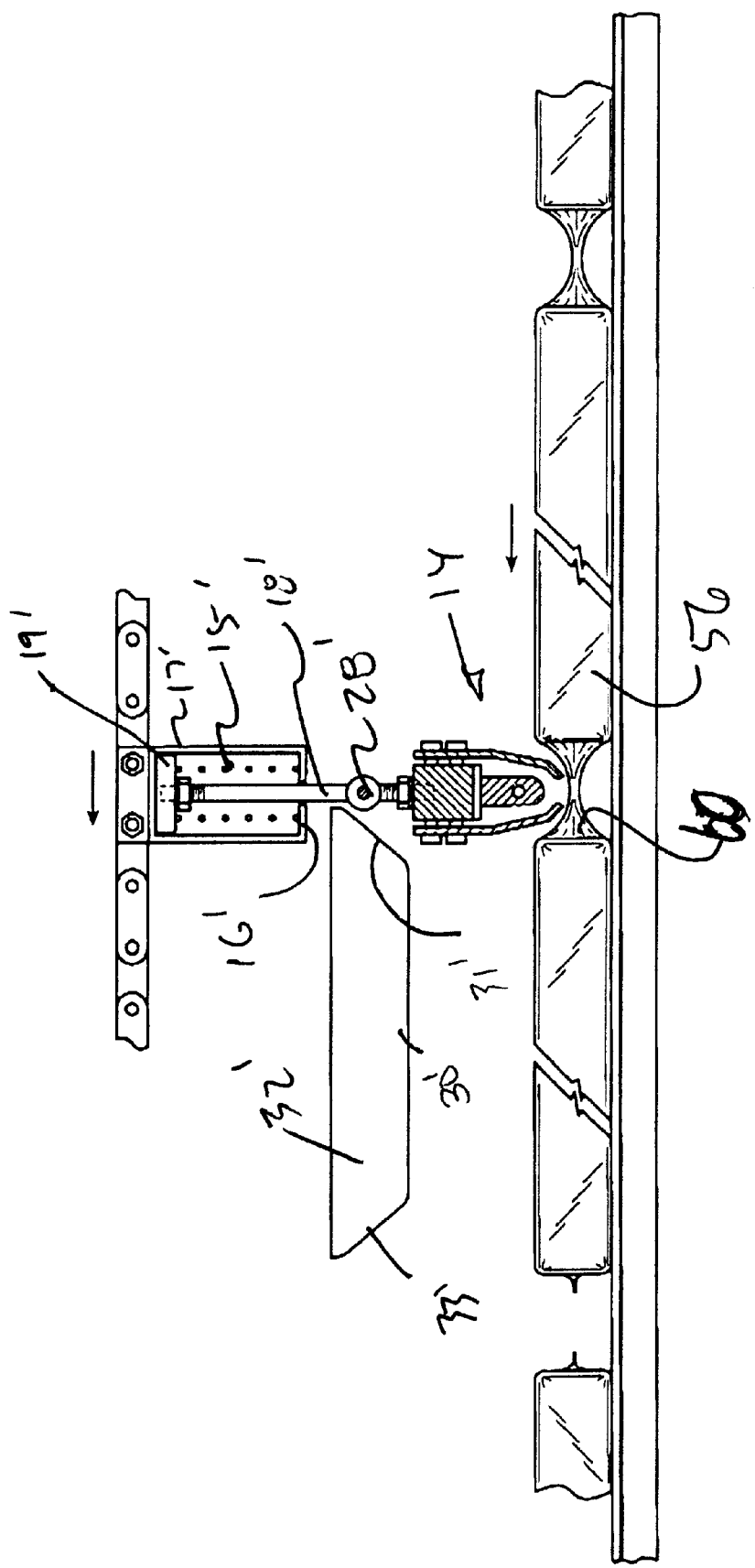
FIG. 9 is a side view of a portion of an alternative embodiment of a sealing device, with the blade held out of contact with the package.
Figure 10:
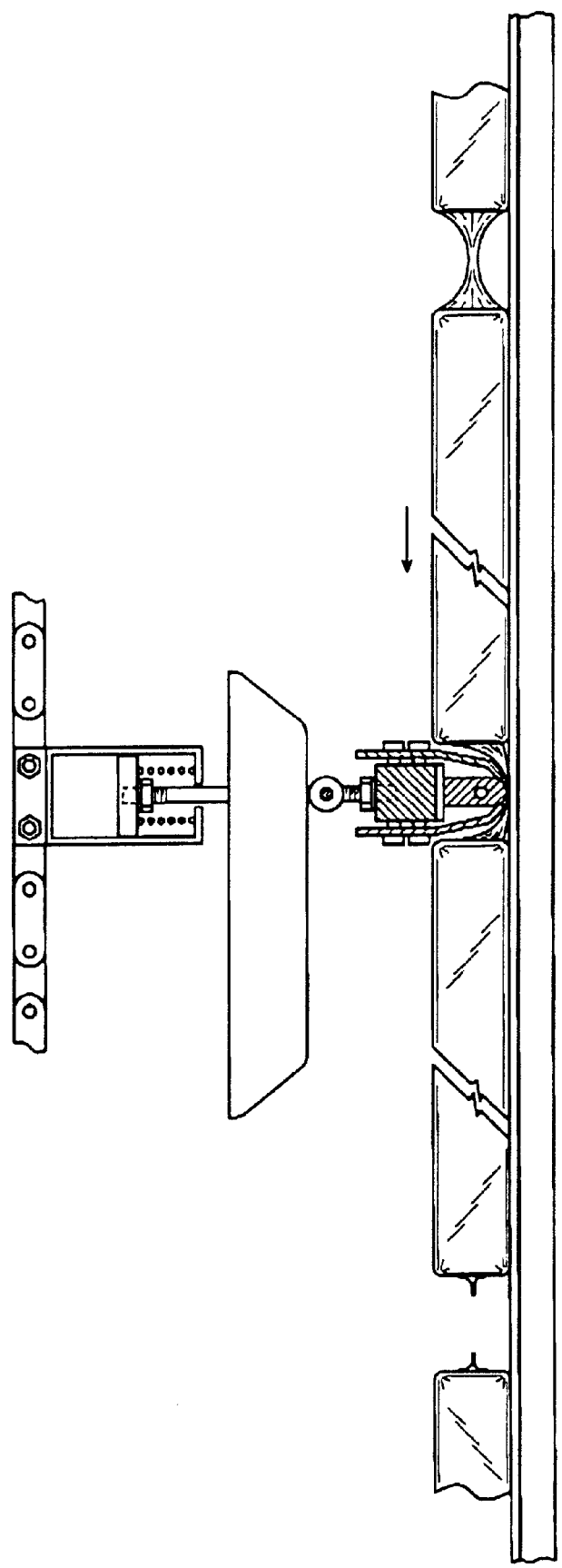
FIG. 10 is a side view of the portion of the sealing device shown in FIG. 9 with the blade in contact with the package.
Figure 11:
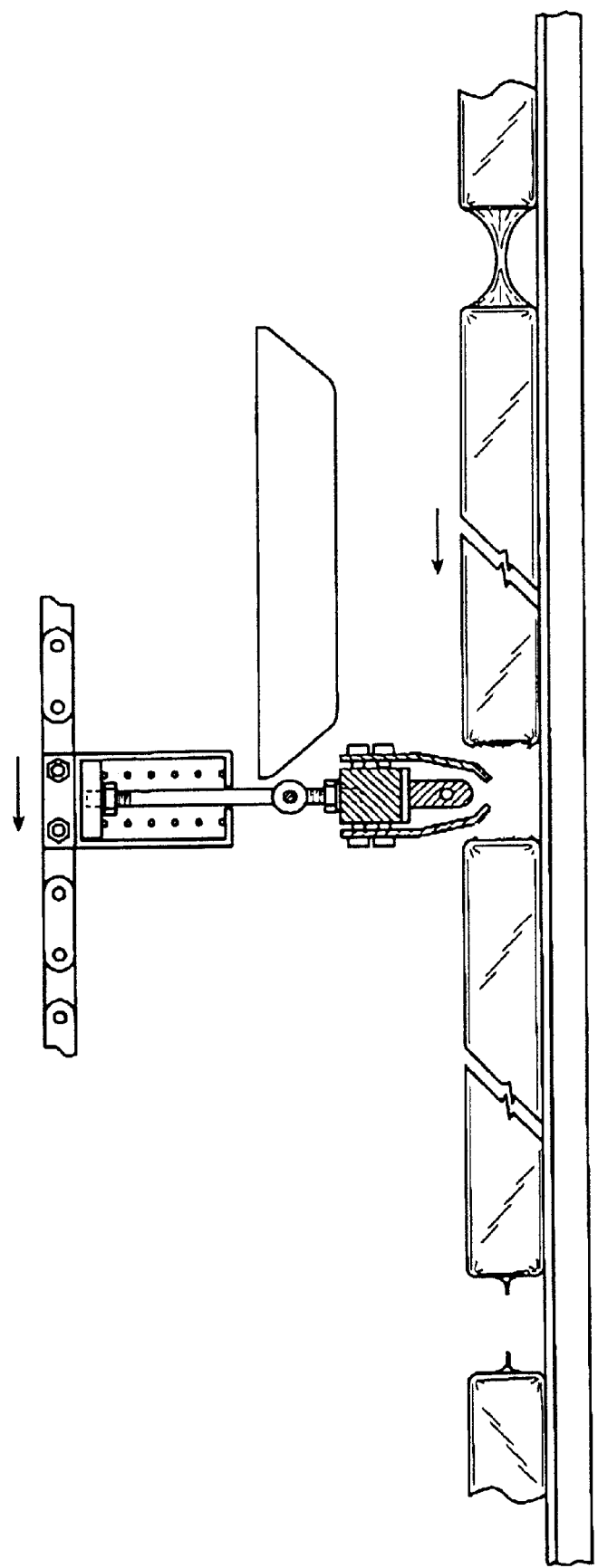
FIG. 11 is a side view of the portion of the sealing device shown in FIG. 9 after contact between the blade and the package.

In an alternative embodiment, as illustrated in FIG. 9, a spring 15' bears against the bottom 16' of the bracket 17' and biases the rod 18' upwardly. The spring contacts a flange 19, attached to the top of the rod 18 in a known manner, illustrated here as a threaded connection, to urge the rod 18 upwardly so the sealing bar 26 is held out of contact with the package 56. The sealing bar 26' is supported by the rod 18' at the bottom end as described above. A lever 28' is provided on the rod 18' for engagement with a cam plate 32'. The cam plate 32' includes a downward ramp 31' to engage the lever 28' and force the rod 18' downwardly to engage the sealing plate 26 with the package 56. As the rod 18' is forced downwardly, the spring 15' is compressed between the bottom 16' and the flange 19'. The cam plate 32' includes a lower portion 30' for holding the sealing bar 26 in contact with the wrapper material 60 for a predetermined time, based on the wrapper material 60, the temperature, line speed, and other factors known to one skilled in the art, as required for proper sealing of the package 56.

Figure 7:
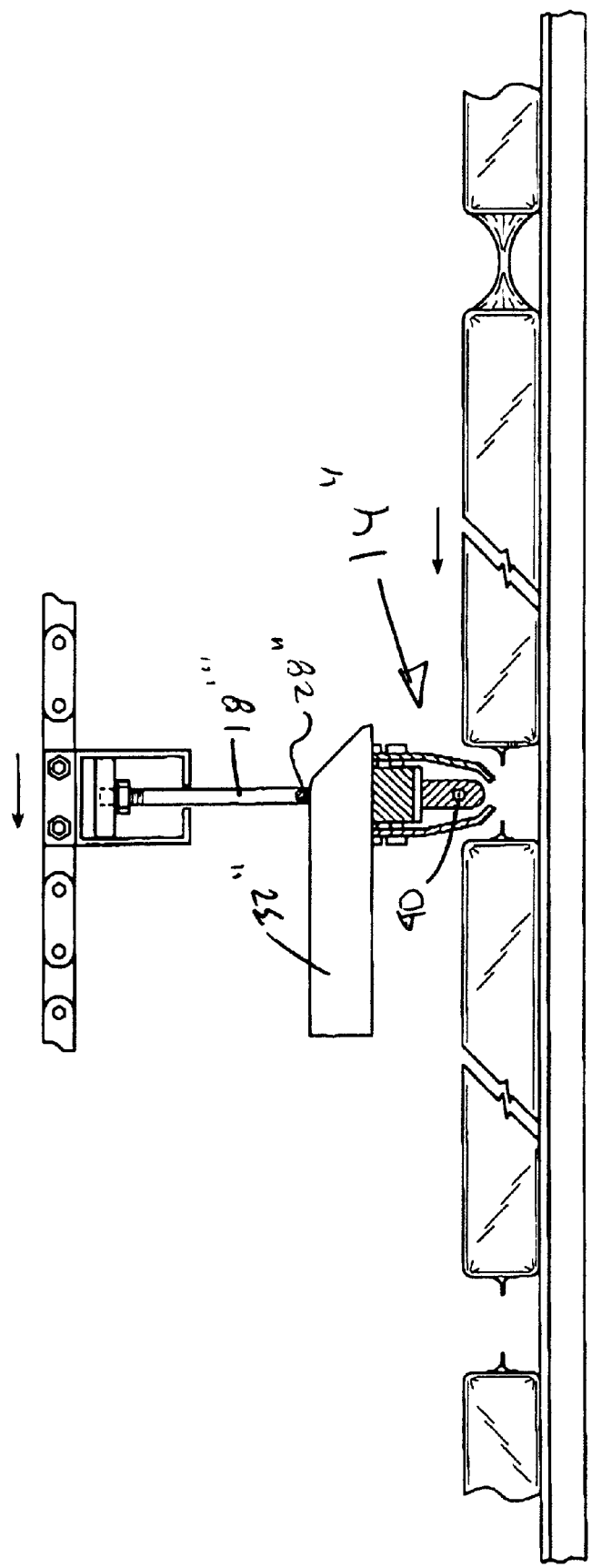
FIG. 7 is a side view of a portion of an alternative embodiment of a sealing device, with the blade held out of contact with the package.

In yet another embodiment, as shown in FIG. 7, the sealing means 14 is supported by a rod as described with reference to FIG. 5. However, the sealing means 14 is urged downwardly without the use of a spring, but instead by the weight of the device. One skilled in the art further appreciates that the sealing unit 14 support illustrated and described herein is only illustrative and support and retraction may be accomplished by various other means not illustrated here for the sake of clarity, including but not limited to linkages, cylinders, servos, and other such means.

Several methods of sealing the polymeric film on the package may be used. In a preferred embodiment, heat is used to seal the package. The seal bar 26 is made a heat conductive metal such as iron and contains a heating element 40 that extends along the entire seal bar. The operating temperature of the seal bar 26 is between 300–700° F. Alternatively, sealing the polymeric film may be accomplished by using ultrasound or vibration. Both methods are well known in the sealing art.

As shown in FIG. 1, the lower device 50 consists of a conveyor 48 which may be constructed of any material strong enough to support the packages and tolerate the sealing action of the sealing device. The conveyor 48 passes over sprockets 52,54 and travels in a first direction 12 as designated by arrow. The speed of the conveyor 48 can be increased or decreased depending on the speed of the manufacturing line and the number of packages to be sealed. Packages 56,58 travel along the conveyor 48 in the first direction 12. The packages 56,58 are encased in a polymeric film. At the ends 57,59 of packages 56,58 is a cavity defined by unsealed polymeric film 60 which joins the packages 56,58.

Between the packages 56,58 and the conveyor 48 a skid plate 72 may be provided for absorbing the impact and heat of the sealing action of the sealing means 14 on the conveyor 48. The skid plate may be constructed of any material suitable for resisting high temperatures and abrasion. Preferably, the skid plate includes a resilient layer such as a commercially available high-temperature silicone sheet. The skid plate 72 is similar to that of commonly assigned U.S. Pat. Nos. 5,755,923 and 5,968,306 and is therefore not illustrated or described herein in great detail.

The operation of the sealing apparatus produces packages 56,58 encased in polymeric film 60 moving in a first direction 12 along conveyor 48. Between the film encased packages is a film connector 60. The film connector 60 is hollow on the inside. The rotating belt 6 containing sealing unit 14 and conveyor 46 move at a synchronized speed. Sealing unit 14 rotates in a first direction 12 on the rotating belt 6. More than one sealing unit may be on the belt at one time.

Figure 8:
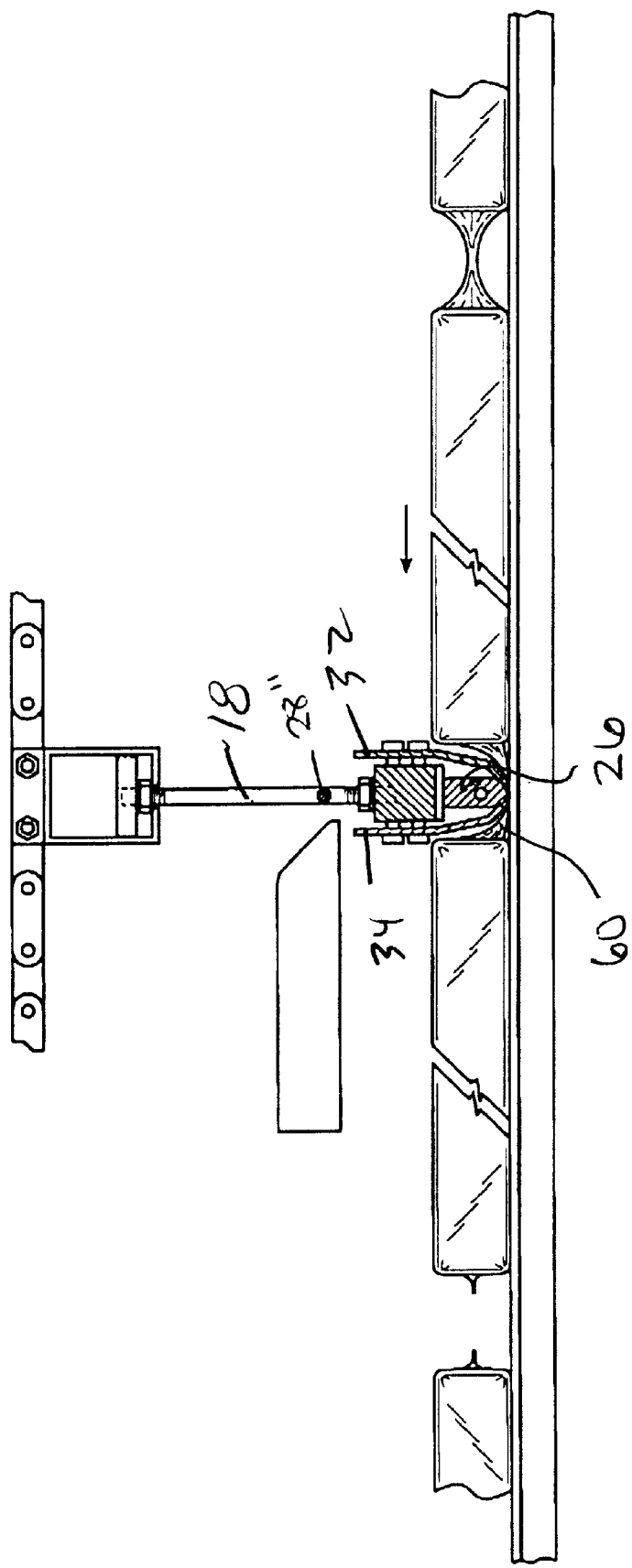
FIG. 8 is a side view of the portion of the sealing device shown in FIG. 7 with the blade in contact with the package.

As the belt 6 turns over the first sprocket 10, the sealing unit 14 rotates to the "down" position over the top of film connector 60, as depicted in FIG. 1. As shown in FIG. 8, the seal bar shields 32,34 engage the wrapper 60 against the conveyor 48 and the seal bar shields 32,34, slide upwardly to reveal the seal bar 26, thus creating a seal in the polymeric film. After sealing, the lever 28" engages the cam plate 32" as described above causing the sealing unit 14 to lift upward and away from the packages 56. The sealing unit travels along the rail until the belt 6 rotates to the second sprocket 8, where the sealing unit ascends and begins another rotation.

It is possible that changes in configurations to other than those shown could be used but that which is shown is preferred and typical. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

What is claimed is:

1. An apparatus for sealing a package comprising:
   a) a first rotating belt;
   b) a second rotating belt adjacent to said first rotating belt;
   c) said first rotating belt and said second rotating belt having a synchronized travel speed;
   d) said first rotating belt carrying a sealing device for sealing said package between said first and second belts; and
   e) a cam plate for releasably engaging said sealing device to force said sealing device into engagement with said second rotating belt.

2. The apparatus of claim 1, wherein said sealing device is spring biased.

3. The apparatus of claim 1, wherein said sealing device is retractable.

4. The apparatus of claim 1 further comprising a plate opposed to said second rotating belt.

5. The apparatus of claim 1 wherein said first rotating belt and said second rotating belt operate at adjustable speeds.

6. The apparatus of claim 1 wherein said sealing device comprises a sealing bar.

7. The apparatus of claim 5 wherein said sealing bar maintains a temperature between 300 and 700° F.

8. The apparatus of claim 1 wherein said sealing bar seals polymeric film packaging material.

9. The apparatus of claim 8 wherein said polymeric film packaging material is sealed by contacting said film with said sealing bar that is heated.

10. The apparatus of claim 9 wherein said polymeric film packaging material is sealed by contacting said film with said sealing bar using ultrasound.

11. The apparatus of claim 10, wherein said plurality of devices for sealing said package are spring biased.

12. The apparatus of claim 11, further comprising a cam plate for releasably disengaging said plurality of sealing devices to force said sealing devices away from engagement with said package.

13. The apparatus of claim 9 wherein said polymeric film packaging material is sealed by contacting said film with said sealing bar using vibration.

14. An apparatus for sealing a package comprising:
   a) a first rotating belt;
   b) a second rotating belt adjacent to said first rotating belt;
   c) said first rotating belt and said second rotating belt having a synchronized travel speed;
   d) said first rotating belt carrying a plurality of devices for sealing said package between said first and second belts; and
   e) a cam plate for releasably engaging at least one of said plurality of devices to force at least one of said plurality sealing devices into engagement with said second rotating belt.

15. The apparatus of claim 14, wherein said plurality of devices for sealing said package are retractable.

16. The apparatus of claim 15, wherein said plurality of sealing devices engage said package due to the weight of the sealing devices, the apparatus further comprising a cam plate to remove said sealing devices away from engagement with said package.

17. The apparatus of claim 14 further comprising a plate opposed to said second rotating belt.

18. The apparatus of claim 14 wherein said heat sealing bar is attached to said first rotating belt by a bracket means.

19. The apparatus of claim 14 wherein said first rotating and said second rotating belt operate at adjustable speeds.

20. The apparatus of claim 14 wherein said plurality of devices for sealing said package maintain a temperature between 300 and 700° F.

21. The apparatus of claim 14 wherein said plurality of devices seal polymeric film packaging material.

22. A process for sealing a package comprising the steps of:
   a) providing a first rotating belt carrying a sealing device;
   b) providing a cam plate;
   c) providing a package surrounded by a tube of polymeric film packaging material;
   d) providing a second rotating belt adjacent to said first rotating belt;
   e) rotating said first and second belts at a synchronized travel speed;
   f) moving said package surrounded by said film between said belts;
   g) contacting said film with said sealing device between said first and second belts;
   h) sealing the package; and
   i) engaging said sealing device with said cam plate so that said sealing device is not in contact with said film.

23. The process of claim 22, wherein said package is sealed by contacting said film with said sealing device that is heated.

24. The process of claim 22, wherein said package is sealed by contacting said film with said sealing device using ultrasound.

25. The process of claim 22, wherein the sealing of said package is performed d by contacting said film with said sealing device using vibration.

26. The process of claim 22, wherein said package includes a first side and a second side and said first and second side are sealed.

27. The process of claim 22, wherein said sealing device maintains a temperature between 300 and 700° F.

28. The process of claim 22, wherein said sealing device is spring biased.

29. The process of claim 22, wherein said sealing device is retractable.

30. The process of claim 22, wherein said first rotating belt and said second rotating belt operate at adjustable speeds.

31. The process of claim 22, wherein said package is roofing material at least partially wrapped in polymeric film packaging material.

32. The process of claim 22 wherein said package is a package of roofing material and said sealing process comprises the steps of:
   a) providing a first rotating belt carrying a sealing device;
   b) providing second rotating belt adjacent to said first rotating belt;
   c) providing a plate opposed to said second rotating belt;
   d) rotating said first and second belts at a synchronized travel speed;
   e) moving said package between said belts;
   f) contacting said package with said sealing device between said first and second belts at a temperature between 300 and 700° F.; and
   g) sealing the package.

* * * * *

UNITED STATES PATENT AND TRADEMARK OFFICE
CERTIFICATE OF CORRECTION

PATENT NO.   : 6,481,188 B1
DATED        : November 19, 2002
INVENTOR(S)  : Graham It is certified that error appears in the above-identified patent and that said Letters Patent is hereby corrected as shown below:

Column 6,
Lines 39 and 40, "rotating and said" should be -- rotating belt and said --

Signed and Sealed this

Twenty-sixth Day of August, 2003

JAMES E. ROGAN
*Director of the United States Patent and Trademark Office*